F. KÜHTZ.
FEED MECHANISM FOR BAKERS' OVENS.
APPLICATION FILED DEC. 31, 1912.

1,085,614.

Patented Feb. 3, 1914.
3 SHEETS—SHEET 1.

F. KÜHTZ.
FEED MECHANISM FOR BAKERS' OVENS.
APPLICATION FILED DEC. 31, 1912.
1,085,614.
Patented Feb. 3, 1914.
3 SHEETS—SHEET 2.
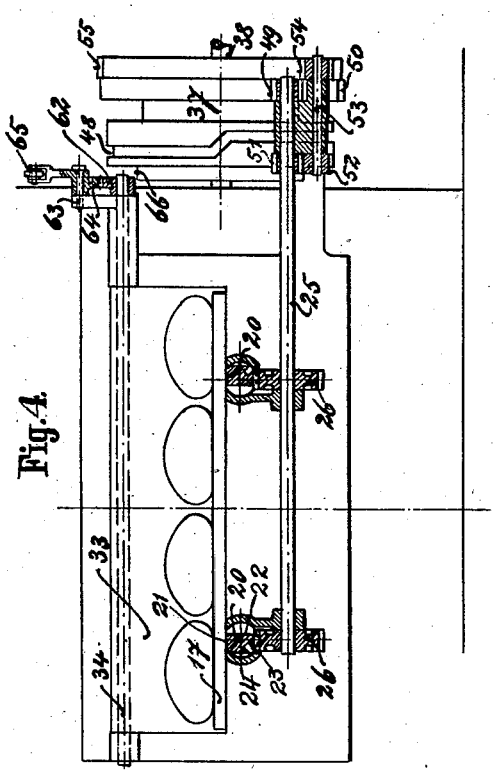
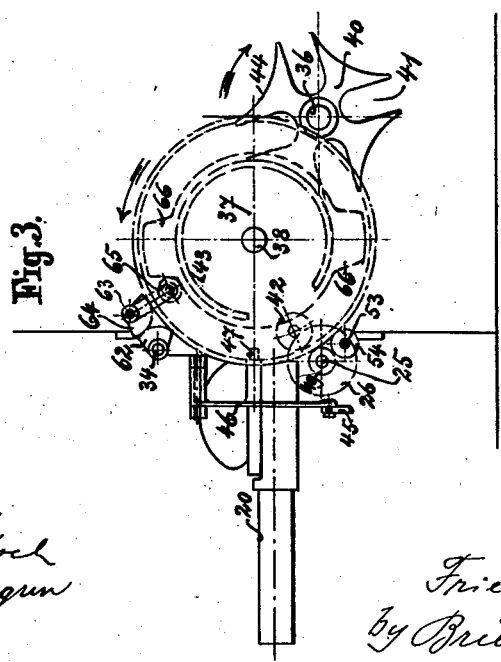
Witnesses
Katherine Koch
Daniel Holmgren
Inventor:
Friedrich Kühtz
by Briesen & Gumpel
Att'ys.

F. KÜHTZ.
FEED MECHANISM FOR BAKERS' OVENS.
APPLICATION FILED DEC. 31, 1912.
1,085,614.
Patented Feb. 3, 1914.
3 SHEETS—SHEET 3.
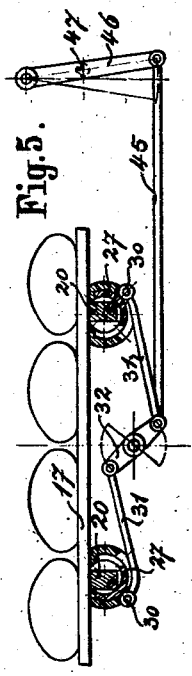
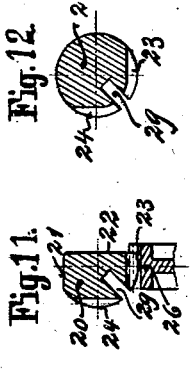
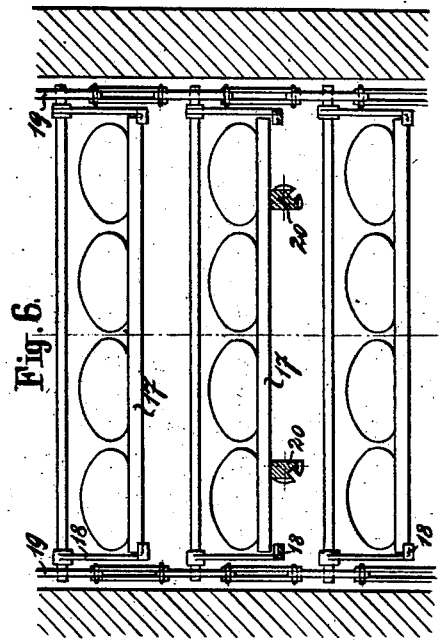
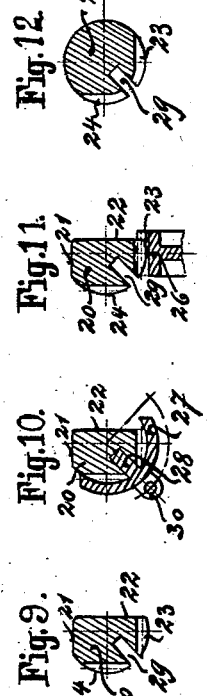
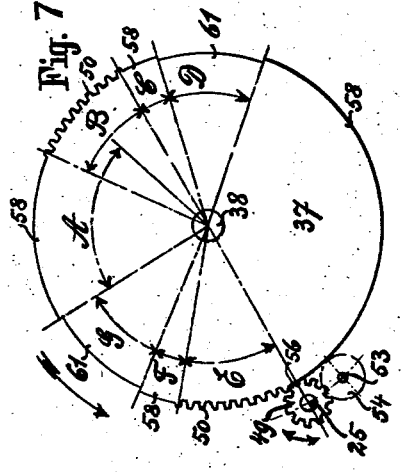
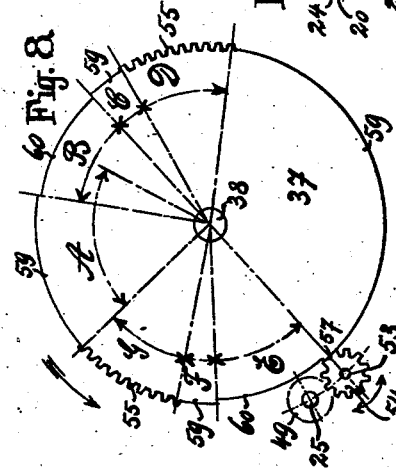
Witnesses
Inventor:
Friedrich Kühtz

UNITED STATES PATENT OFFICE.

FRIEDRICH KÜHTZ, OF CANNSTATT-STUTTGART, GERMANY.

FEED MECHANISM FOR BAKERS' OVENS.

1,085,614.  Specification of Letters Patent.  Patented Feb. 3, 1914.

Application filed December 31, 1912. Serial No. 739,490.

*To all whom it may concern:*

Be it known that I, FRIEDRICH KÜHTZ, a subject of the King of Wurttemberg, residing at Cannstatt-Stuttgart, Wurttemberg, Germany, have invented a new and useful Feed Mechanism for Bakers' Ovens, of which the following is a specification.

This invention relates to an improvement in bakers' ovens and more particularly to novel and efficient means for introducing the charge into the baking chamber and withdrawing it therefrom.

Figure 1:
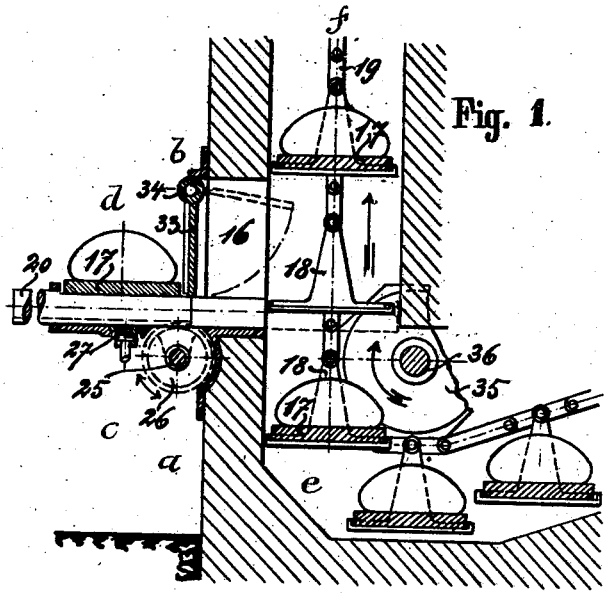
Figure 2:
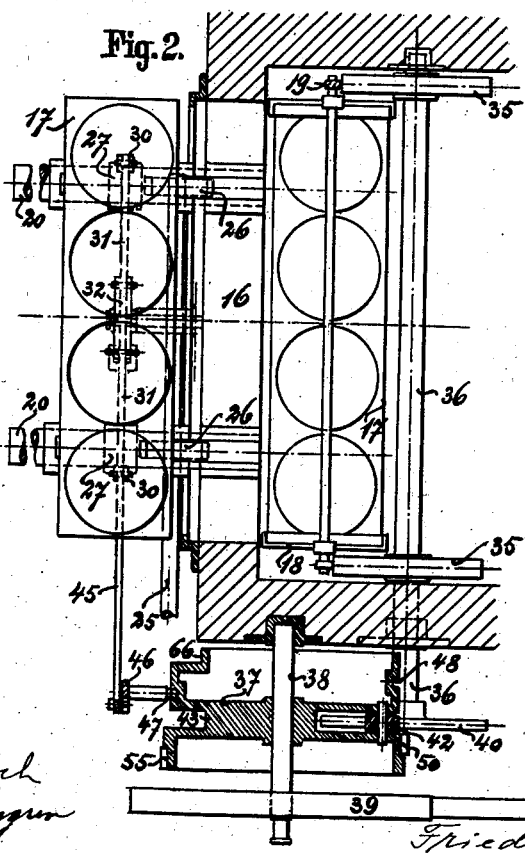

In the accompanying drawing: Figure 1 is a longitudinal section of part of a baker's oven provided with a feeding mechanism embodying my invention. Fig. 2 is a sectional plan; Fig. 3 a front elevation of the switching mechanism; Fig. 4 a section on line *a—b*, Fig. 1; Fig. 5 a section on line *c—d*, Fig. 1; Fig. 6 a section on line *e—f*, Fig. 1, Figs. 7 and 8 are elevations of a gear wheel of the apparatus, and Figs. 9–12 cross sections through the rod 20.

Referring to Figs. 1 and 2, the numeral 16 represents an opening through which the goods to be baked are inserted. The baking plates 17 traversing the oven are placed loosely in the frames 18 loosely suspended from the chains 19. The plates 17 or the chains 19 travel intermittently, in such a manner that when a baking plate 17 arrives in front of the opening 16 it comes to rest for a short time.

At the bottom of the opening 16, two cylindrical rods 20 are arranged adapted to slide horizontally and also to rotate; by sliding these rods the baking plates can be removed with the baked goods on them and replaced carrying fresh goods. For this purpose, the rods 20, at the ends which enter the oven, are provided for a length corresponding with the breadth of the baking plate, with two flats at about 90° to each other, one of them, 21, being at a greater distance from the axis of the rod than the other, 22 (Figs. 9–12). The rods 20 are pushed into the oven under the plate 17 lying on the frame 18, the angular position of the rod being that in which flat 22 is the upper surface; they are then turned on their axes through an angle of 90° so that the flat 21 becomes the upper surface as shown in Figs. 6 and 9–11, whereby the baking plate 17 is lifted from the frame; the rods 20 together with the plate 17 are then withdrawn from the oven. After the baked goods have been removed from the withdrawn baking plate 17, and fresh goods have been placed thereon, which is done either by hand or automatically, the rods 20 with the flat 21 uppermost and carrying the plate 17 are returned to the oven; the rods are now turned back through 90° until the flat 22 becomes the upper surface and the baking plate 17 again rests in its frame 18. The rods 20 being then withdrawn the flat 22 still uppermost remain in this position until the next plate 17 arrives in front of the opening 16, whereupon the procedure is repeated.

The rods are constructed as racks, the teeth being made on two sides 23 and 24 opposite the sides on which are the flats respectively (see Figs. 9–12), the two racks being necessary because the rods, as explained above, have to be moved in the oven in either of two angular positions.

The rods 20 are moved by the gear wheels 26 on the shaft 25, and therefore on each rod, at the part which is engaged with the gear wheel 26, at the moment when the rod is turned the two racks 23 and 24 are united to form a quadrant (Fig. 12).

The segments 27 which turn the rods 20 fit the periphery of the rods and each has a feather 28 adapted to engage a groove 29 in the rod. This device insures that the rods 20 rotate with the segments 27 but can move axially relatively to the segments. These segments 27 are coupled together by links 31 pivoted at one end to the segment as at 30, and at the other end to a lever 32, so that when the latter is turned the rods 30 turn both inward or both outward thus preventing a lateral displacement of the plate 17 when it is raised or lowered.

To close the opening 16 an inwardly opening drop door 33 is provided which turns on the shaft 34 and automatically opens when the baking plate is being withdrawn from or inserted into the oven and immediately closes behind it.

The chain wheels 35 are fixed to a common shaft 36 with which they rotate, as already stated, through an angle corresponding with the distance apart of the baking plates and then stop during the time occupied in withdrawing and replacing plate 17. In Fig. 1 the distance between the baking plates corresponds by way of example, with a quarter revolution of the chain wheel 35.

The distributing wheel 37 drives the various moving parts; it may be fixed on a shaft 38 driven through belt pulley 29 by a motor or any other means, the speed of which can be regulated.

The movement of the chain wheels 35, shaft 36 and plates 17 by a Geneva movement is as follows:—On the extended shaft 36 is fixed a star wheel 40 having four notches 41, which engage in succession with a roller 42 turning on a pin fixed in the distributing wheel 37, so that for each complete revolution of the wheel 37 and during a portion of the revolution the star wheel 40 and with it the chain wheels 35 are rotated through a quarter revolution. As soon as the roller 42 leaves each groove 41 in the star wheel 40, the periphery of the reduced portion 43 of the distributing wheel 37 engages cavity 44 between the notches 41 of the star wheel 40 and locks the latter, so that the roller 42 will always enter the next notch 41. Where the roller 42 is placed the reduced portion 43 is cut away in order to allow the points of the wheel 40 to pass. This method of driving the chain wheels has the advantage that the movement starts slowly and without jerks, then increases in speed and again stops without jerks.

The lever 32 for turning the rods 20 is oscillated through the lever 46 and connecting rod 45; the lever 46 carries a projection on which is a roller 47 engaging a suitable cam groove 48 on the periphery of the wheel 37.

The longitudinal movement of the rods 20, that is to say the oscillation of the shaft 25 and gear wheels 26 is effected in the following manner:—The wheels 26 are of such diameter that a complete revolution of the wheels corresponds with the complete longitudinal distance traversed by the rods 20, so that for pushing in the rods 20 the wheels 26 and the shaft 25 make one complete revolution forward while for withdrawing the rods they make a complete revolution backward.

The shaft 25 is extended to the controlling wheel 37 where it carries a pinion 49 adapted to engage a mutilated tooth gear 50 on that wheel. Further, the shaft 25 is coupled with the shaft 53 by the two gear wheels 51 and 52 of equal size, and on this shaft there is a pinion 54 similar to pinion 49 and also engaging a mutilated tooth gear 55 on the wheel 37. These two tooth gears 50 and 55 are shown in Figs. 7 and 8; they are so arranged that when the gear 50 engages with the pinion 49 the gear wheels 26 are rotated forward and the rods 20 are pushed into the oven, while when the gear 55 engages with the pinion 54 the gear wheels 26 are rotated backward and the rods 20 withdrawn from the oven.

The two pinions 49 and 54 make, as already stated, a complete revolution each time; they each have a flattened portion 56, 57 with which at the end of each revolution engage the surfaces 58, 59 respectively, situated between the toothed segments 50 and 55, thus locking pinions 49 and 54 and preventing their rotation.

Owing to the coupling of the two pinions 49 and 54 if, for example, wheel 49 rotates forward then 54 must rotate backward, wherefore at the parts in question between the toothed segments 55 and the surfaces 59 the deep notches 60 are provided and for the same reason there are notches 61 between the toothed segments 50 and the surfaces 58.

A revolution of the controlling wheel 37 effects the following series of movements, as will be seen from Figs. 7 and 8: 1. The star wheel 40 is rotated through a quarter revolution and the baking plates 17 moved onward. 2. The rods 20 are pushed into the oven (with the flat 22 uppermost). 3. The rods 20 are rotated through 90° so that the flats 21 become uppermost and the baking plate 17 is lifted from the frame 18. 4. Withdrawal of the rods 20 (flats 21 uppermost) with the baking plate 17 thereon. 5. Re-insertion of the rods 20 into the oven (flats 21 uppermost) with the baking plate 17. 6. Rotation of the rods 20 through 90° so that the flats 22 become uppermost and the plate 17 again rests on the frame 18. 7. Withdrawal of the rods 20 (flats 22 uppermost) from the oven.

Before the movement 1 is finished, movement 2 commences so that the rods 20 are pushed under the plate 17 as soon as this is in position. Between D and E there is a short pause to allow removal of the baked goods from and substitution of fresh goods on the plate 17.

As a last automatic movement there is the opening or closing of the oven door 33 for which purpose a toothed segment 62 is keyed to the extended shaft 34 and engages a like segment 64 pivoted on a bolt 63. An arm 65, carrying a roller, is rigidly connected with this segment 64, which roller slides over a cam 66 on the distributing wheel 37. As soon as one of the two cams 66 presses against the roller and displaces arm 65 sideward, the door 33 is opened, and closes again as soon as cam 66 has passed the roller. The two cams on the curve are so placed that the opening and closing of the door 33 occurs once during the movement 4 and again during the movement E. These various movements combined under one distributing wheel can of course be performed by separate gear, but the operation is more complicated.

I claim:—

1. A baker's oven comprising a baking chamber, a conveyer movable therein, a baking plate removably supported on the conveyer, a pair of rotatable rods, each rod being provided with a pair of faces located at unequal distances from the rod axis, means for axially sliding in and out of said rods, they being slid inward underneath the baking plate while their faces next to the rod axes are uppermost, and means for turning the rods to bring uppermost the faces farthest from the rod axes, whereby the baking plate is raised off the conveyer.

2. A baker's oven comprising a baking chamber, a conveyer movable therein, a baking plate removably supported on the conveyer, a pair of toothed and grooved rods, each rod being provided with a pair of faces located at unequal distances from the rod axis, pinions engaging the rod-teeth, means for rotating said pinions to slide in and out the rods, they being slid inward underneath the baking plate while their faces next to the rod-axes are uppermost, segments having feathers that engage the rod-grooves, and means for turning said segments to bring uppermost the rod-faces farthest from the rod axes, whereby the baking plate is raised off the conveyer.

3. A baker's oven comprising a baking chamber, a conveyer movable therein, a baking plate removably supported on the conveyer, a pair of toothed and grooved rods, each rod being provided with a pair of faces located at unequal distances from the rod axis, pinions engaging the rod-teeth, a shaft carrying said pinions, means for rotating said shaft, thereby sliding in and out the rods, they being slid inward underneath the baking plate while their faces next to the rod-axes are uppermost, segments having feathers that engage the rod grooves, a lever connected to the segments, a cam wheel, and means for operably connecting said wheel to the lever, whereby the segments are turned to bring uppermost the rod-faces farthest from the rod-axes and raise the baking plate off the conveyer.

FRIEDRICH KÜHTZ.

Witnesses:
FRIDA KLAIBER,
ERNEST ENTENMANN.